(12) United States Patent
Fang (10) Patent No.: US 11,314,049 B2
(45) Date of Patent: Apr. 26, 2022

(54) CAMERA OPTICAL LENS INCLUDING SEVEN LENSES OF +−++−+− REFRACTIVE POWERS

(71) Applicant: AAC Optics Solutions Pte. Ltd., Singapore (SG)

(72) Inventor: Chunhuan Fang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 375 days.

(21) Appl. No.: 16/702,587

(22) Filed: Dec. 4, 2019

(65) Prior Publication Data
US 2020/0209545 A1    Jul. 2, 2020

(30) Foreign Application Priority Data
Dec. 31, 2018  (CN) .......................... 201811650529.2

(51) Int. Cl.
*G02B 9/64*     (2006.01)
*G02B 13/00*    (2006.01)

(52) U.S. Cl.
CPC ........... *G02B 9/64* (2013.01); *G02B 13/0045* (2013.01)

(58) Field of Classification Search
CPC .............................. G02B 13/0045; G02B 9/64
See application file for complete search history.

(56) References Cited

U.S. PATENT DOCUMENTS

2019/0227277 A1 *   7/2019   Tang .................. G02B 13/0045

* cited by examiner

*Primary Examiner* — Wen Huang
(74) *Attorney, Agent, or Firm* — W&G Law Group (57) ABSTRACT

The present disclosure relates to the field of optical lenses and provides a camera optical lens. The camera optical lens includes, from an object side to an image side: an aperture; a first lens having a positive refractive power; a second lens having a negative refractive power; a third lens having a positive refractive power; a fourth lens having a positive refractive power; a fifth lens having a negative refractive power; a sixth lens having a positive refractive power; and a seventh lens having a negative refractive power. The camera optical lens satisfies following conditions: 1.68≤n2≤2.20; and 15.00≤f3/f, where f denotes a focal length of the camera optical lens; n2 denotes a refractive index of the second lens; and f3 denotes a focal length of the third lens.

7 Claims, 7 Drawing Sheets

CAMERA OPTICAL LENS INCLUDING SEVEN LENSES OF +−++−+− REFRACTIVE POWERS

TECHNICAL FIELD

The present disclosure relates to the field of optical lens, and more particularly, to a camera optical lens suitable for handheld terminal devices, such as smart phones or digital cameras and camera devices such as monitors or PC lenses.

BACKGROUND

With the emergence of smart phones in recent years, the demand for miniature camera lens is increasing day by day, but in general the photosensitive devices of camera lens are nothing more than Charge Coupled Device (CCD) or Complementary Metal-Oxide Semiconductor Sensor (CMOS sensor), and as the progress of the semiconductor manufacturing technology makes the pixel size of the photosensitive devices become smaller, plus the current development trend of electronic products towards better functions and thinner and smaller dimensions, miniature camera lenses with good imaging quality therefore have become a mainstream in the market.

In order to obtain better imaging quality, the lens that is traditionally equipped in mobile phone cameras adopts a three-piece or four-piece lens structure, or even five-piece or six piece lens structure. Also, with the development of technology and the increase of the diverse demands of users, and as the pixel area of photosensitive devices is becoming smaller and smaller and the requirement of the system on the imaging quality is improving constantly, a seven-piece lens structure gradually appears in lens designs. Although the common seven-piece lens has good optical performance, its settings on refractive power, lens spacing and lens shape still have some irrationality, which results in that the lens structure cannot achieve a high optical performance while satisfying design requirements for wide-angle and ultra-thin lenses having a big aperture.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
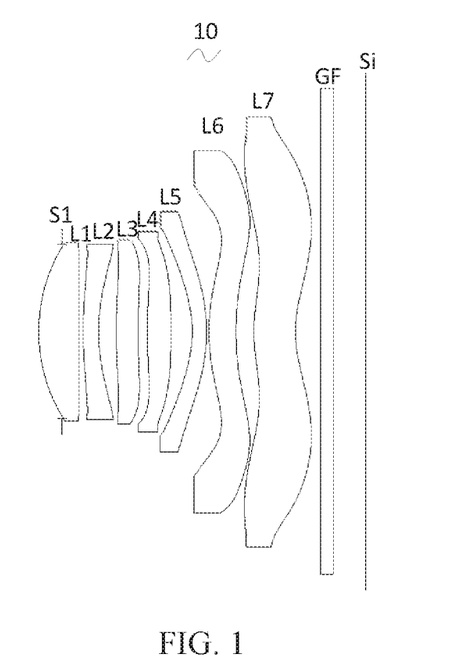
FIG. 1 is a schematic diagram of a structure of a camera optical lens in accordance with Embodiment 1 of the present disclosure.

Referring to FIG. 1, the present disclosure provides a camera optical lens 10. FIG. 1 shows the camera optical lens 10 according to Embodiment 1 of the present disclosure. The camera optical lens 10 includes 7 lenses. Specifically, the camera optical lens 10 includes, from an object side to an image side, an aperture S1, a first lens L1, a second lens L2, a third lens L3, a fourth lens L4, a fifth lens L5, a sixth lens L6 and a seventh lens L7. An optical element such as a glass plate GF can be arranged between the seventh lens L7 and an image plane Si. The glass plate GF can be a glass cover plate or an optical filter. In other embodiments, the glass plate GF can be arranged at other positions.

In present embodiment, the first lens L1 has a positive refractive power, and has an object side surface being a convex surface and an image object surface being a concave surface; the second lens L2 has a negative refractive power, and has an object side surface being a convex surface and an image object surface being a concave surface; the third lens L3 has a positive refractive power, and has an object side surface being a convex surface and an image object surface being a concave surface; the fourth lens L4 has a positive refractive power, and has an object side surface being a convex surface and an image object surface being a convex surface; the fifth lens L5 has a negative refractive power, and has an object side surface being a concave surface and an image object surface being a convex surface; a sixth lens L6 has a positive refractive power, and has an object side surface being a convex surface and an image object surface being a concave surface; and the seventh lens L7 has a negative refractive power, and has an object side surface being a convex surface and an image object surface being a concave surface.

In addition, a surface of a lens can be set as an aspherical surface. The aspherical surface can be easily formed into a shape other than the spherical surface, so that more control variables can be obtained to reduce the aberration, thereby reducing the number of lenses and thus effectively reducing a total length of the camera optical lens according to the present disclosure. In an embodiment of the present disclosure, both an object side surface and an image side surface of each lens are aspherical surfaces.

Here, a focal length of the camera optical lens 10 is defined as f in a unit of millimeter (mm), a refractive index of the second lens L2 is defined as n2, and a focal length of the third lens L3 is defined as f3, where f, n2 and f3 should satisfy following conditions:

$$1.68 \leq n2 \leq 2.20 \quad (1); \text{ and}$$

$$15.00 \leq f3/f \quad (2).$$

The condition (1) specifies the refractive index of the second lens L2. It should be noted that with a development towards wide-angle and ultra-thin lenses, using an optical material having a refractive index within the range of the condition (1) can facilitate improving the optical performance of the camera optical lens while further shortening a total length of the camera optical lens.

The condition (2) specifies a ratio of the focal length of the third lens L3 and the focal length of the camera optical lens 10. This leads to the appropriate distribution of the refractive power for the third lens L3, thereby facilitating improving the optical performance of the camera optical lens 10.

In this embodiment, with the above configurations of the lenses including respective lenses having different refractive powers, in which there is a specific relationship between focal lengths of the third lens L3 and the camera optical lens 10 and the second lens having a refractive index satisfying a specific range is used, the camera optical lens can achieve a high optical performance while satisfying design requirements for wide-angle and ultra-thin lenses having a big aperture.

In an example, a focal length of the sixth lens L6 is defined as f6, and f6 and f should satisfy a following condition of:

$$2.50 \leq f6/f \leq 5.00 \quad (3).$$

The condition (3) specifies a ratio of the focal length of the sixth lens L6 and the focal length of the camera optical lens 10. This leads to the appropriate distribution of the refractive power for the sixth lens L6, thereby facilitating correction of aberrations of the camera optical lens 10 and thus improving the imaging quality.

In this embodiment, the first lens L1 has a focal length of f1; the second lens L2 has a focal length of f2; the third lens L3 has a focal length of f3; the fourth lens L4 has a focal length of f4; and the fifth lens L5 has a focal length of f5, where f1, f2, f3, f4 and f5 satisfy a following condition of:

$$10.00 \leq |f1+f3+f4|/|f2+f5| \leq 20.00 \quad (4).$$

The condition (4) specifies a ratio of an absolute value of a sum of the focal length f1 of the first lens L1, the focal length f3 of the third lens L3 and the focal length f4 of the fourth lens L4 to an absolute value of a sum of the focal length f2 of the second lens L2 and the focal length f5 of the fifth lens L5. This can facilitate improving the imaging quality of the camera optical lens.

In an example, a curvature radius of the object side surface of the third lens L3 is defined as R5 and a curvature radius of the image side surface of the third lens L3 is defined as R6, where R5 and R6 satisfy a condition of:

$$(R5+R6)/(R5-R6) \leq -20.00 \quad (5).$$

The condition (5) specifies a shape of the third lens L3. Within this range, a development towards wide-angle lenses having a big aperture can alleviate a deflection degree of light passing through the lens, thereby effectively reducing aberrations.

In an example, the focal length of the second lens L2 is defined as f2 in a unit of millimeter (mm), and f2 and f satisfy a condition of:

$$-15.00 \leq f2 - f \leq -11.00 \quad (6).$$

The condition (6) specifies a difference between the focal length f2 of the second lens L2 and the focal lens f of the camera optical lens 10. This can facilitate improving the imaging quality of the camera optical lens.

In an example, a curvature radius of the object side surface of the fifth lens L5 is defined as R9 and a curvature radius of the image side surface of the fifth lens L5 is defined as R10, where R9 and R10 satisfy a condition of:

$$-10.00 \leq (R9+R10)/(R9-R10) \leq -6.00 \quad (7).$$

The condition (7) specifies a shape of the fifth lens. This can effectively correct aberrations caused by the first four lenses (L1, L2, L3 and L4) of the camera optical lens.

In an example, an on-axis thickness of the first lens L1 is defined as d1, an on-axis distance from the image side surface of the first lens L1 to the object side surface of the second lens L2 is defined as d2, and d1 and d2 satisfy a condition of:

$$9.00 \leq d1/d2 \leq 12.00 \quad (8).$$

The condition (8) specifies a ratio of the on-axis thickness of the first lens L1 and the on-axis distance from the image side surface of the first lens L1 to the object side surface of the second lens L2. This can facilitate processing and assembly of the lenses.

It should be noted that the first lens L1, the second lens L2, the third lens L3, the fourth lens L4, the fifth lens L5, the sixth lens L6 and the seventh lens L7 that constitute the camera optical lens 10 of the present embodiment have the structure and parameter relationships as described above, and therefore, the camera optical lens 10 can reasonably distribute the refractive power, the surface shape, the material, the on-axis thickness and the like of each lens, and thus correct various aberrations. The camera optical lens 10 has Fno≤1.70. A total optical length from the object side surface of the first lens to an image plane of the camera optical lens along an optic axis (TTL) and an image height (IH) of the camera optical lens 10 satisfy a condition of TTL/IH≤1.57. The field of view (FOV) of the camera optical lens 10 satisfies FOV≥76.60 degrees. This can achieve a high optical performance for the camera optical lens 10 while satisfying design requirements for wide-angle and ultra-thin lenses having a big aperture.

In an example, inflexion points and/or arrest points can be arranged on the object side surface and/or image side surface of the lens, so as to satisfy the demand for the high quality imaging. The description below can be referred to for specific implementations.

FIG. 1 is a schematic diagram of a structure of the camera optical lens 10 in accordance with Embodiment 1 of the present disclosure. The design information of the camera optical lens 10 in Embodiment 1 of the present disclosure is shown in the following.

Table 1 lists curvature radiuses of object side surfaces and images side surfaces of the first lens L1 to the seventh lens L7 constituting the camera optical lens 10, on-axis thicknesses of the lenses, distances between the lenses, the refractive index nd and the abbe number vd according to Embodiment 1 of the present disclosure. Table 2 shows conic coefficients k and aspheric surface coefficients. It should be noted that each of the distance, radii and the central thickness is in a unit of millimeter (mm).

TABLE 1

|  | R |  | d | nd |  | vd |  |
|---|---|---|---|---|---|---|---|
| S1 | ∞ | d0 = | −0.391 | | | | |
| R1 | 2.139 | d1 = | 0.679 | nd1 | 1.5385 | v1 | 55.93 |
| R2 | 31.782 | d2 = | 0.071 | | | | |
| R3 | 3.780 | d3 = | 0.263 | nd2 | 1.6900 | v2 | 31.00 |
| R4 | 2.113 | d4 = | 0.302 | | | | |
| R5 | 6.900 | d5 = | 0.371 | nd3 | 1.5449 | v3 | 55.93 |
| R6 | 7.198 | d6 = | 0.160 | | | | |
| R7 | 6.178 | d7 = | 0.402 | nd4 | 1.5449 | v4 | 55.93 |
| R8 | −9.633 | d8 = | 0.360 | | | | |
| R9 | −1.528 | d9 = | 0.245 | nd5 | 1.6355 | v5 | 23.97 |
| R10 | −2.111 | d10 = | 0.039 | | | | |
| R11 | 2.708 | d11 = | 0.459 | nd6 | 1.5449 | v6 | 55.93 |
| R12 | 3.941 | d12 = | 0.304 | | | | |
| R13 | 2.136 | d13 = | 0.707 | nd7 | 1.5403 | v7 | 55.69 |
| R14 | 1.529 | d14 = | 0.432 | | | | |
| R15 | ∞ | d15 = | 0.210 | ndg | 1.5168 | vg | 64.17 |
| R16 | ∞ | d16 = | 0.553 | | | | |

In the table, meanings of various symbols will be described as follows.

R: curvature radius of an optical surface;
S1: aperture;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the fourth lens L4;
R8: curvature radius of the image side surface of the fourth lens L4;
R9: curvature radius of the object side surface of the fifth lens L5;
R10: curvature radius of the image side surface of the fifth lens L5;
R11: curvature radius of the object side surface of the sixth lens L6;
R12: curvature radius of the image side surface of the sixth lens L6;
R13: curvature radius of the object side surface of the seventh lens L7;
R14: curvature radius of the image side surface of the seventh lens L7;
R15: curvature radius of an object side surface of the glass plate GF;
R16: curvature radius of an image side surface of the glass plate GF;
d: on-axis thickness of a lens or an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the optical filter GF;
d15: on-axis thickness of the glass plate GF;
d16: on-axis distance from the image side surface of the glass plate GF to the image plane Si;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the glass plate GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the glass plate GF.

TABLE 2

| | Conic coefficient | Aspherical surface coefficients | | | | | | |
|---|---|---|---|---|---|---|---|---|
| | k | A4 | A6 | A8 | A10 | A12 | A14 | A16 |
| R1 | 5.0226E−01 | −1.4284E−02 | 2.5602E−02 | −4.9996E−02 | 4.7395E−02 | −2.5999E−02 | 8.5600E−03 | −1.5363E−03 |
| R2 | 5.6791E+02 | −5.3058E−02 | 9.2456E−02 | −9.7796E−02 | 6.3144E−02 | −2.3871E−02 | 4.2725E−03 | −4.8268E−04 |
| R3 | 6.0695E+00 | −1.6747E−01 | 1.9521E−01 | −2.0796E−01 | 1.5367E−01 | −7.9060E−02 | 2.3118E−02 | −3.1080E−03 |
| R4 | 8.1602E−01 | −1.4826E−01 | 1.6220E−01 | −2.0832E−01 | 1.9146E−01 | −1.1697E−01 | 3.9166E−02 | −5.6033E−03 |
| R5 | 2.3918E+01 | −3.4441E−02 | −5.2511E−03 | −1.6968E−02 | 1.5157E−02 | −6.1204E−03 | 1.5038E−03 | −3.8898E−04 |
| R6 | 2.4138E+01 | −5.0487E−02 | −3.1343E−03 | −2.0752E−02 | 1.2591E−02 | −7.0312E−03 | 1.5018E−03 | 5.5041E−05 |
| R7 | −6.7684E+00 | −4.2986E−02 | 2.0130E−03 | −1.9987E−02 | 1.1724E−02 | −7.1352E−03 | 1.6850E−03 | −8.3344E−05 |
| R8 | 4.6872E+00 | −3.3728E−02 | 1.2884E−02 | −3.5729E−02 | 1.7268E−02 | 5.8535E−03 | −6.8371E−03 | 1.6686E−03 |

TABLE 2-continued

| | Conic coefficient | Aspherical surface coefficients | | | | | | |
|---|---|---|---|---|---|---|---|---|
| | k | A4 | A6 | A8 | A10 | A12 | A14 | A16 |
| R9 | −4.1334E+00 | 1.3187E−02 | 1.1392E−02 | −6.8712E−02 | 7.0049E−02 | −2.9025E−02 | 4.8568E−03 | −2.2576E−04 |
| R10 | −1.4849E−01 | 7.1144E−02 | −6.3124E−02 | 5.0824E−02 | −2.0503E−02 | 4.9654E−03 | −8.1058E−04 | 7.1440E−05 |
| R11 | −1.1511E+01 | 7.1144E−02 | −8.2136E−02 | 4.1546E−02 | −1.5232E−02 | 2.9211E−03 | −2.0609E−04 | −5.5202E−07 |
| R12 | −1.0908E+01 | 4.6054E−02 | −2.9411E−02 | 4.7914E−03 | −2.8424E−04 | −1.5523E−05 | −7.0210E−07 | −3.9937E−08 |
| R13 | −1.1284E+00 | −1.8742E−01 | 5.7000E−02 | −9.1257E−03 | 7.5224E−04 | −3.8045E−05 | −1.9427E−06 | 1.0471E−07 |
| R14 | −8.0211E−01 | −1.7632E−01 | 5.9865E−02 | −1.7129E−02 | 3.2707E−03 | 9.8853E−06 | 2.3928E−05 | −6.1954E−07 |

In Table 2, k is a conic coefficient, and A4, A6, A8, A10, A12, A14 and A16 are aspheric surface coefficients.

In the present embodiment, an aspheric surface of each lens surface uses the aspheric surfaces shown in the above condition (9). However, the present disclosure is not limited to the aspherical polynomials form shown in the condition (9).

$$Y=(x^2/R)/\{1+[1-(1+k)(x^2/R^2)]^{1/2}\}+A4x^4+A6x^6+A8x^8+A10x^{10}+A12x^{12}+A14x^{14}+A16x^{16} \quad (9)$$

Table 3 and Table 4 show design data of inflexion points and arrest points of respective lens in the camera optical lens 10 according to Embodiment 1 of the present disclosure. P1R1 and P1R2 represent the object side surface and the image side surface of the first lens L1, respectively, P2R1 and P2R2 represent the object side surface and the image side surface of the second lens L2, respectively, P3R1 and P3R2 represent the object side surface and the image side surface of the third lens L3, respectively, P4R1 and P4R2 represent the object side surface and the image side surface of the fourth lens L4, respectively, P5R1 and P5R2 represent the object side surface and the image side surface of the fifth lens L5, respectively, P6R1 and P6R2 represent the object side surface and the image side surface of the sixth lens L6, respectively, and P7R1 and P7R2 represent the object side surface and the image side surface of the seventh lens L7, respectively. The data in the column named "inflexion point position" refers to vertical distances from inflexion points arranged on each lens surface to the optic axis of the camera optical lens 10. The data in the column named "arrest point position" refers to vertical distances from arrest points arranged on each lens surface to the optic axis of the camera optical lens 10.

TABLE 3

| | Number of inflexion points | Inflexion point position 1 | Inflexion point position 2 | Inflexion point position 3 |
|---|---|---|---|---|
| P1R1 | 1 | 1.255 | | |
| P1R2 | 3 | 0.275 | 0.625 | 0.945 |
| P2R1 | 1 | 0.745 | | |
| P2R2 | 1 | 1.025 | | |
| P3R1 | 2 | 0.615 | 1.285 | |
| P3R2 | 2 | 0.505 | 1.355 | |
| P4R1 | 1 | 0.525 | | |
| P4R2 | 1 | 1.255 | | |
| P5R1 | | | | |
| P5R2 | 3 | 1.145 | 1.515 | 1.685 |
| P6R1 | 3 | 0.865 | 1.915 | 2.095 |
| P6R2 | 1 | 1.035 | | |
| P7R1 | 2 | 0.505 | 1.695 | |
| P7R2 | 2 | 0.695 | 2.785 | |

TABLE 4

| | Number of arrest points | Arrest point position 1 | Arrest point position 2 |
|---|---|---|---|
| P1R1 | | | |
| P1R2 | 1 | 1.065 | |
| P2R1 | 1 | 1.165 | |
| P2R2 | | | |
| P3R1 | 1 | 0.995 | |
| P3R2 | 1 | 0.805 | |
| P4R1 | 1 | 0.835 | |
| P4R2 | 1 | 1.425 | |
| P5R1 | | | |
| P5R2 | | | |
| P6R1 | 1 | 1.345 | |
| P6R2 | 1 | 1.605 | |
| P7R1 | 2 | 0.975 | 2.585 |
| P7R2 | 1 | 1.535 | |

In addition, Table 13 below further lists various values of Embodiment 1 and values corresponding to parameters which are specified in the above conditions.

Figure 2:
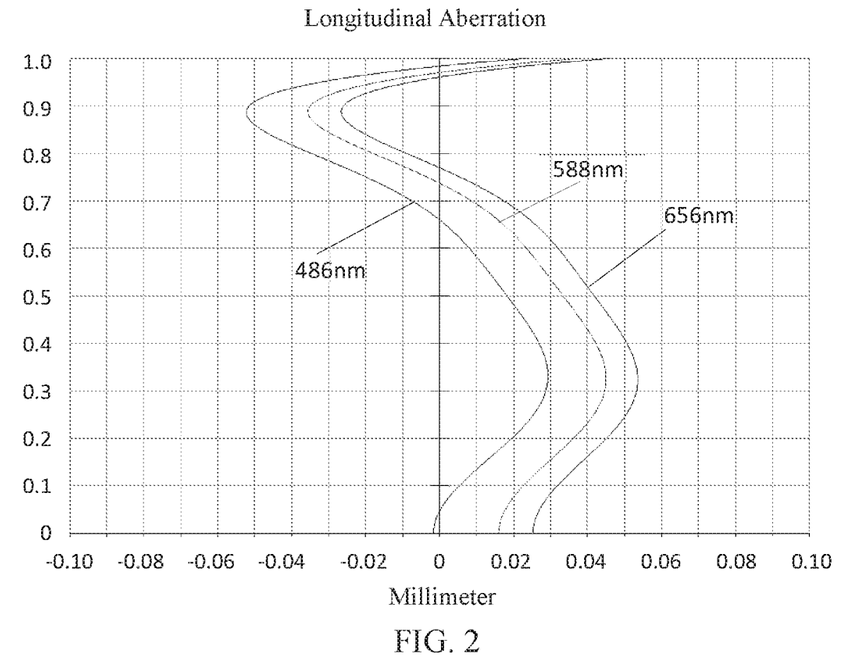
FIG. 2 is a schematic diagram of a longitudinal aberration of the camera optical lens shown in FIG. 1.
Figure 3:
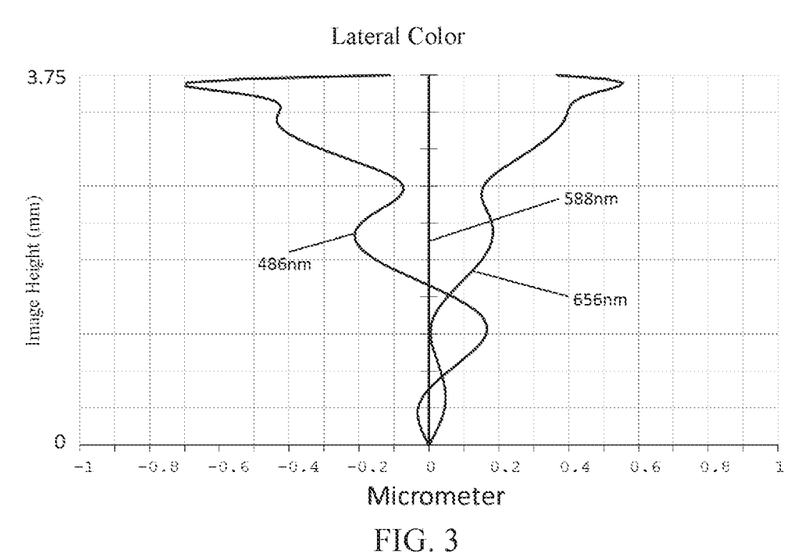
FIG. 3 is a schematic diagram of a lateral color of the camera optical lens shown in FIG. 1.
Figure 4:
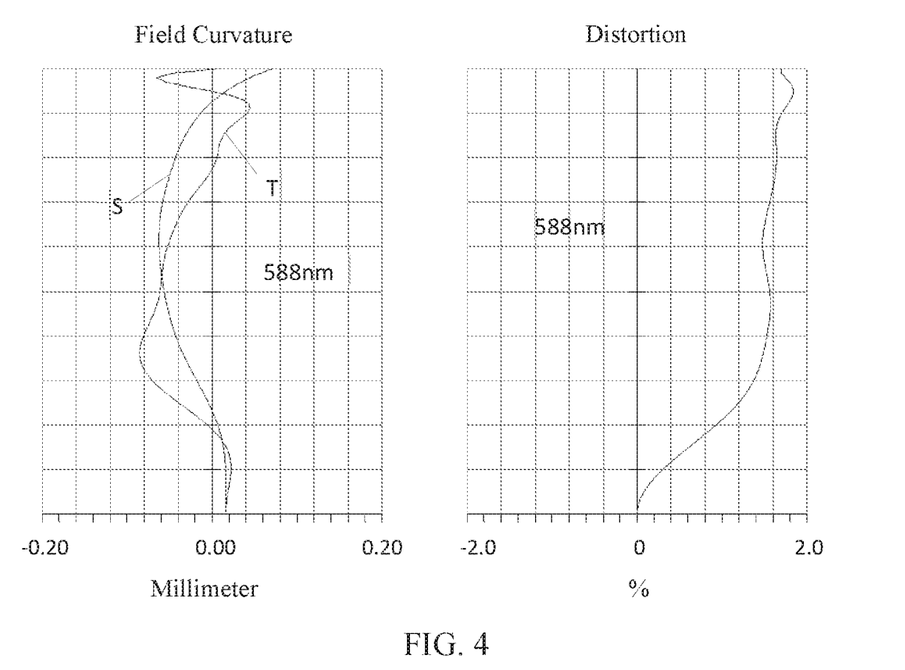
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 486 nm, 588 nm and 656 nm after passing the camera optical lens 10 according to Embodiment 1. FIG. 4 illustrates a field curvature and a distortion of light with a wavelength of 588 nm after passing the camera optical lens 10 according to Embodiment 1, in which a field curvature S is a field curvature in a sagittal direction and T is a field curvature in a tangential direction.

In this embodiment, a full FOV of the camera optical lens is 2ω, and an F number is Fno, where 2ω=78.25° and Fno=1.70. Thus, the camera optical lens can achieve a high imaging performance while satisfying design requirements for wide-angle and ultra-thin lenses having a big aperture.

Embodiment 2

Figure 5:
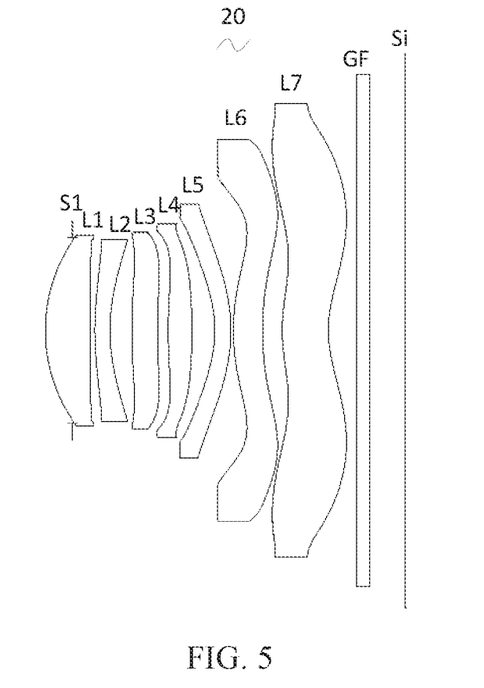
FIG. 5 is a schematic diagram of a structure of a camera optical lens in accordance with Embodiment 2 of the present disclosure.

FIG. 5 is a schematic diagram of a structure of a camera optical lens in accordance with Embodiment 2 of the present disclosure. Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | | nd | | vd | |
|---|---|---|---|---|---|---|---|
| S1 | ∞ | d0 = | −0.423 | | | | |
| R1 | 2.038 | d1 = | 0.695 | nd1 | 1.5385 | v1 | 55.93 |
| R2 | 31.299 | d2 = | 0.070 | | | | |
| R3 | 3.558 | d3 = | 0.230 | nd2 | 1.8470 | v2 | 23.80 |
| R4 | 2.121 | d4 = | 0.336 | | | | |
| R5 | 6.938 | d5 = | 0.399 | nd3 | 1.5449 | v3 | 55.93 |

TABLE 5-continued

| | R | d | | nd | | vd | |
|---|---|---|---|---|---|---|---|
| R6 | 7.200 | d6 = | 0.164 | | | | |
| R7 | 6.432 | d7 = | 0.360 | nd4 | 1.5449 | v4 | 55.93 |
| R8 | −9.304 | d8 = | 0.360 | | | | |
| R9 | −1.517 | d9 = | 0.245 | nd5 | 1.6355 | v5 | 23.97 |
| R10 | −2.080 | d10 = | 0.037 | | | | |
| R11 | 2.764 | d11 = | 0.455 | nd6 | 1.5449 | v6 | 55.93 |
| R12 | 4.026 | d12 = | 0.300 | | | | |
| R13 | 2.131 | d13 = | 0.712 | nd7 | 1.5403 | v7 | 55.69 |
| R14 | 1.522 | d14 = | 0.425 | | | | |
| R15 | ∞ | d15 = | 0.210 | ndg | 1.5168 | vg | 64.17 |
| R16 | ∞ | d16 = | 0.553 | | | | |

TABLE 6

| | Conic coefficient | Aspherical surface coefficients | | | | | | |
|---|---|---|---|---|---|---|---|---|
| | k | A4 | A6 | A8 | A10 | A12 | A14 | A16 |
| R1 | 4.9883E−01 | −1.5448E−02 | 2.5393E−02 | −5.1203E−02 | 4.6728E−02 | −2.5356E−02 | 8.5264E−03 | −1.5174E−03 |
| R2 | 6.0971E+02 | −4.9767E−02 | 9.3819E−02 | −9.8128E−02 | 6.2886E−02 | −2.3980E−02 | 4.2379E−03 | −5.1591E−04 |
| R3 | 6.0197E+00 | −1.6145E−01 | 1.9285E−01 | −2.0881E−01 | 1.5312E−01 | −7.9233E−02 | 2.3179E−02 | −3.1955E−03 |
| R4 | 8.3249E−01 | −1.4530E−01 | 1.6579E−01 | −2.0918E−01 | 1.9097E−01 | −1.1705E−01 | 3.9343E−02 | −5.4667E−03 |
| R5 | 2.3864E+01 | −3.4055E−02 | −5.7843E−03 | −1.7485E−02 | 1.5169E−02 | −6.2372E−03 | 1.4518E−03 | −3.4346E−04 |
| R6 | 2.3562E+01 | −5.0443E−02 | −2.9739E−03 | −2.0553E−02 | 1.2777E−02 | −6.9240E−03 | 1.5365E−03 | −8.6411E−05 |
| R7 | −7.6512E+00 | −4.2750E−02 | 2.0231E−02 | −2.0019E−02 | 1.1746E−02 | −7.1053E−03 | 1.7105E−03 | −5.8947E−05 |
| R8 | 5.4048E+00 | −3.3836E−02 | 1.2708E−02 | −3.5766E−02 | 1.7263E−02 | 5.8468E−03 | −6.8355E−03 | 1.6607E−03 |
| R9 | −4.2052E+00 | 1.3378E−02 | 1.1621E−02 | −6.8685E−02 | 7.0095E−02 | −2.9022E−02 | 4.8587E−03 | −2.2674E−04 |
| R10 | −1.4458E−01 | 7.1101E−02 | −6.3199E−02 | 5.0802E−02 | −2.0510E−02 | 4.9633E−03 | −8.0993E−04 | 7.1542E−05 |
| R11 | −1.1760E+01 | 7.1101E−02 | −8.2175E−02 | 4.1563E−02 | −1.5232E−02 | 2.9211E−03 | −2.0619E−04 | −5.4088E−07 |
| R12 | −1.1091E+01 | 4.6205E−02 | −2.9411E−02 | 4.7914E−03 | −2.8420E−04 | −1.5520E−05 | −7.0034E−07 | −3.9834E−08 |
| R13 | −1.1291E+00 | −1.8738E−01 | 5.6999E−02 | −9.1253E−03 | 7.5230E−04 | −3.8044E−04 | −1.9423E−06 | 1.0498E−07 |
| R14 | −8.0186E−01 | −1.7617E−01 | 5.9866E−02 | −1.7129E−02 | 3.2707E−03 | 9.9071E−06 | 2.3929E−05 | −6.1956E−07 |

Table 7 and table 8 show design data of inflexion points and arrest points of respective lens in the camera optical lens 20 according to Embodiment 2 of the present disclosure.

TABLE 7

| | Number of inflexion points | Inflexion point position 1 | Inflexion point position 2 | Inflexion point position 3 | Inflexion point position 4 | Inflexion point position 5 |
|---|---|---|---|---|---|---|
| P1R1 | 1 | 1.305 | | | | |
| P1R2 | 5 | 0.305 | 0.495 | 1.005 | 1.225 | 1.265 |
| P2R1 | 2 | 0.905 | 1.225 | | | |
| P2R2 | 1 | 1.095 | | | | |
| P3R1 | 1 | 0.605 | | | | |
| P3R2 | 1 | 0.495 | | | | |
| P4R1 | 1 | 0.515 | | | | |
| P4R2 | 1 | 1.265 | | | | |
| P5R1 | | | | | | |
| P5R2 | 3 | 1.185 | 1.465 | 1.715 | | |
| P6R1 | 3 | 0.875 | 1.915 | 2.095 | | |
| P6R2 | 1 | 1.035 | | | | |
| P7R1 | 2 | 0.505 | 1.695 | | | |
| P7R2 | 2 | 0.705 | 2.765 | | | |

TABLE 8

| | Number of arrest points | Arrest point position 1 | Arrest point position 2 |
|---|---|---|---|
| P1R1 | | | |
| P1R2 | 2 | 1.155 | 1.245 |
| P2R1 | | | |
| P2R2 | | | |

TABLE 8-continued

| | Number of arrest points | Arrest point position 1 | Arrest point position 2 |
|---|---|---|---|
| P3R1 | 1 | 0.965 | |
| P3R2 | 1 | 0.805 | |
| P4R1 | 1 | 0.825 | |
| P4R2 | 1 | 1.435 | |
| P5R1 | | | |
| P5R2 | | | |
| P6R1 | 1 | 1.345 | |
| P6R2 | 1 | 1.605 | |
| P7R1 | 2 | 0.985 | 2.545 |
| P7R2 | 1 | 1.555 | |

In addition, Table 13 below further lists various values of Embodiment 2 and values corresponding to parameters which are specified in the above conditions.

Figure 6:
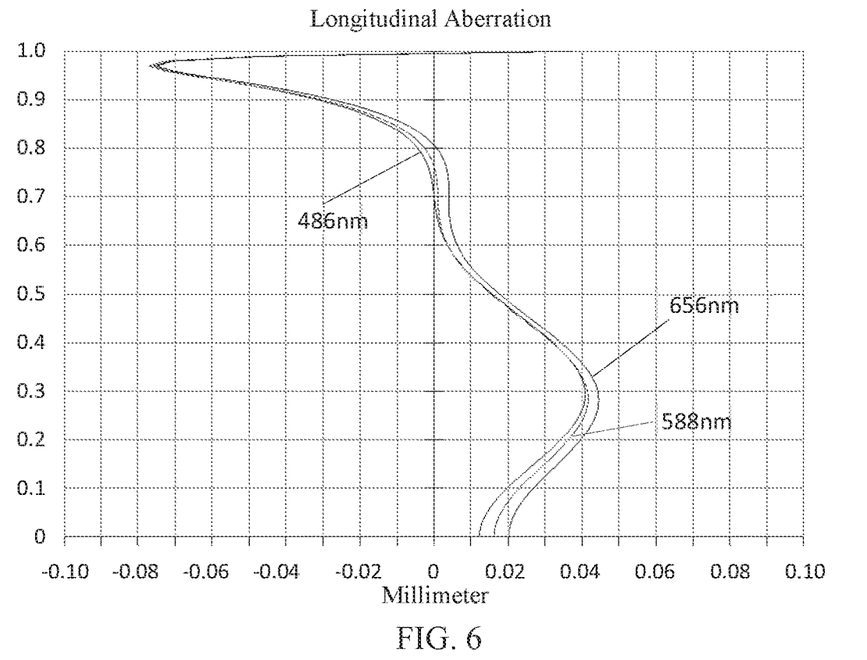
FIG. 6 is a schematic diagram of a longitudinal aberration of the camera optical lens shown in FIG. 5.
Figure 7:
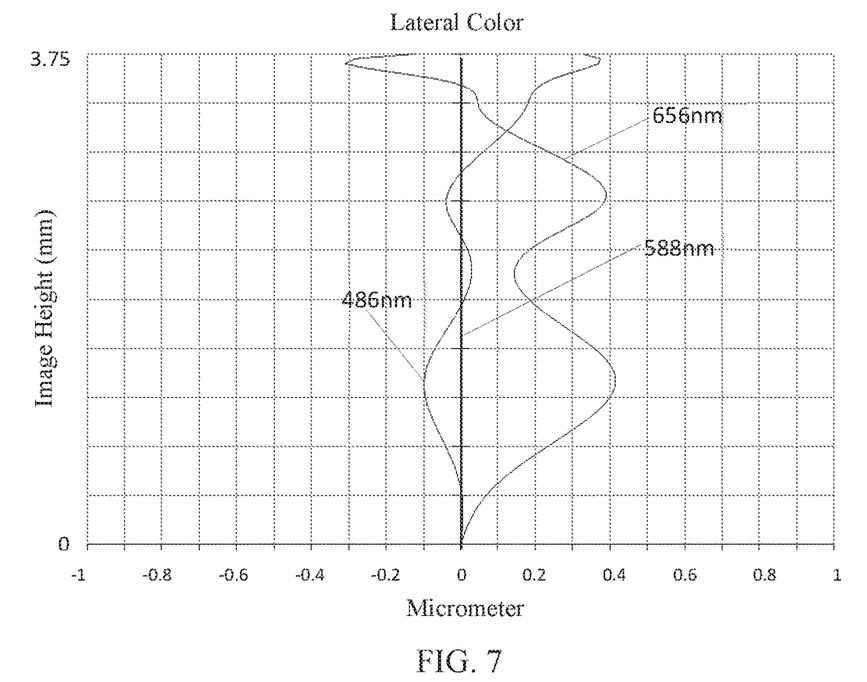
FIG. 7 is a schematic diagram of a lateral color of the camera optical lens shown in FIG. 5.
Figure 8:
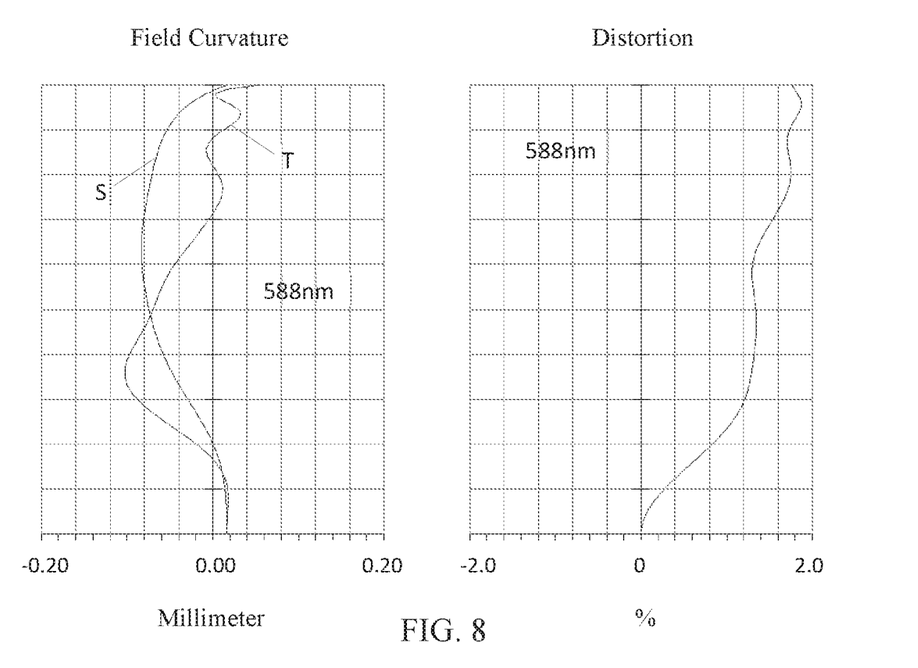
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 486 nm, 588 nm and 656 nm after passing the camera optical lens 20 according to Embodiment 2. FIG. 8 illustrates a field curvature and a distortion of light with a wavelength of 588 nm after passing the camera optical lens 20 according to Embodiment 2, in which a field curvature S is a field curvature in a sagittal direction and T is a field curvature in a tangential direction.

In the camera optical lens 20 according to this embodiment, 2ω=77.95° and Fno=1.70. Thus, the camera optical lens 20 can achieve a high imaging performance while satisfying design requirements for wide-angle and ultra-thin lenses having a big aperture.

Embodiment 3

Figure 9:
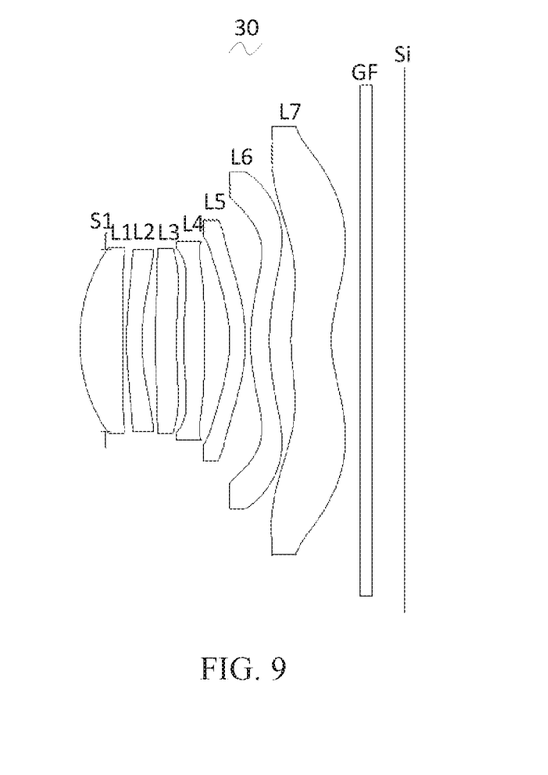
FIG. 9 is a schematic diagram of a structure of a camera optical lens in accordance with Embodiment 3 of the present disclosure.

FIG. 9 is a schematic diagram of a structure of a camera optical lens in accordance with Embodiment 3 of the present disclosure. Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

| | R | d | | nd | | vd | |
|---|---|---|---|---|---|---|---|
| S1 | ∞ | d0 = | −0.437 | | | | |
| R1 | 2.118 | d1 = | 0.721 | nd1 | 1.5385 | v1 | 55.93 |

TABLE 9-continued

| | R | d | | nd | | vd |
|---|---|---|---|---|---|---|
| R2 | 35.257 | d2 = | 0.071 | | | |
| R3 | 3.707 | d3 = | 0.259 | nd2 | 2.0020 | v2 20.70 |
| R4 | 2.319 | d4 = | 0.225 | | | |
| R5 | 6.932 | d5 = | 0.364 | nd3 | 1.5449 | v3 55.93 |
| R6 | 7.138 | d6 = | 0.121 | | | |
| R7 | 4.948 | d7 = | 0.354 | nd4 | 1.5449 | v4 55.93 |
| R8 | −12.611 | d8 = | 0.426 | | | |
| R9 | −1.591 | d9 = | 0.268 | nd5 | 1.6355 | v5 23.97 |
| R10 | −2.110 | d10 = | 0.085 | | | |
| R11 | 2.449 | d11 = | 0.321 | nd6 | 1.5449 | v6 55.93 |
| R12 | 3.155 | d12 = | 0.362 | | | |
| R13 | 2.392 | d13 = | 0.687 | nd7 | 1.5403 | v7 55.69 |
| R14 | 1.564 | d14 = | 0.479 | | | |
| R15 | ∞ | d15 = | 0.210 | ndg | 1.5168 | vg 64.17 |
| R16 | ∞ | d16 = | 0.553 | | | |

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | 5.2608E−01 | −9.3910E−03 | 2.2877E−02 | −5.0970E−02 | 4.7050E−02 | −2.5896E−02 | 8.6997E−03 | −1.3629E−03 |
| R2 | 7.1078E+02 | −4.8877E−02 | 9.9501E−02 | −9.8265E−02 | 6.1679E−02 | −2.4037E−02 | 4.4816E−03 | −6.9231E−05 |
| R3 | 6.0376E+00 | −1.5865E−01 | 1.9202E−01 | −2.0774E−01 | 1.5425E−01 | −7.8962E−02 | 2.3129E−02 | −3.0604E−03 |
| R4 | 8.0022E−01 | −1.5280E−01 | 1.6528E−01 | −2.0768E−01 | 1.9108E−01 | −1.1721E−01 | 3.9265E−02 | −5.4339E−03 |
| R5 | 2.2087E+01 | −3.3752E−02 | −6.0263E−03 | −1.6104E−02 | 1.6108E−02 | −5.6300E−03 | 1.6671E−03 | −3.5962E−04 |
| R6 | 2.5791E+01 | −4.7091E−02 | −9.4346E−04 | −2.1338E−02 | 1.2536E−02 | −6.8132E−03 | 1.7379E−03 | 5.1311E−05 |
| R7 | −6.0401E+00 | −4.4874E−02 | −1.7159E−03 | −1.8812E−02 | 1.2064E−02 | −7.2289E−03 | 1.4932E−03 | −1.9922E−04 |
| R8 | −4.1360E+02 | −2.2009E−02 | 1.5574E−02 | −3.5132E−02 | 1.7652E−02 | 5.9934E−03 | −6.8027E−03 | 1.6504E−03 |
| R9 | −7.0284E+00 | 1.1521E−02 | 1.3708E−02 | −6.8249E−02 | 6.9845E−02 | −2.9180E−02 | 4.8163E−03 | −2.2428E−04 |
| R10 | −2.1964E−01 | 7.7690E−02 | −6.3385E−02 | 5.0594E−02 | −2.0515E−02 | 4.9604E−03 | −8.1342E−04 | 6.8280E−05 |
| R11 | −1.2091E+01 | 7.7690E−02 | −8.0600E−02 | 4.1779E−02 | −1.5232E−02 | 2.9110E−03 | −2.0846E−04 | −6.8809E−07 |
| R12 | −1.2342E+01 | 3.8997E−02 | −2.9759E−02 | 4.8127E−03 | −2.7981E−04 | −1.5437E−05 | −9.4312E−07 | −1.0064E−07 |
| R13 | −1.2009E+00 | −1.8787E−01 | 5.6995E−02 | −9.1223E−03 | 7.5297E−04 | −3.8034E−04 | −1.9362E−06 | 1.0380E−07 |
| R14 | −8.0743E−01 | −1.7922E−01 | 5.9910E−02 | −1.7116E−02 | 3.2721E−03 | 1.0256E−05 | 2.3932E−05 | −6.2027E−07 |

Table 11 and table 12 show design data of inflexion points and arrest points of respective lens in the camera optical lens 30 according to Embodiment 3 of the present disclosure.

TABLE 11

| | Number of inflexion points | Inflexion point position 1 | Inflexion point position 2 |
|---|---|---|---|
| P1R1 | | | |
| P1R2 | 2 | 0.285 | 0.455 |
| P2R1 | 2 | 0.945 | 1.255 |
| P2R2 | 1 | 0.915 | |
| P3R1 | 2 | 0.605 | 1.115 |
| P3R2 | 2 | 0.525 | 1.275 |
| P4R1 | 1 | 0.545 | |
| P4R2 | 1 | 1.125 | |
| P5R1 | | | |
| P5R2 | 2 | 1.085 | 1.435 |
| P6R1 | 1 | 0.795 | |
| P6R2 | 1 | 0.945 | |
| P7R1 | 2 | 0.475 | 1.755 |
| P7R2 | 2 | 0.675 | 2.755 |

TABLE 12

| | Number of arrest points | Arrest point position 1 | Arrest point position 2 |
|---|---|---|---|
| P1R1 | | | |
| P1R2 | | | |
| P2R1 | | | |

TABLE 12-continued

| | Number of arrest points | Arrest point position 1 | Arrest point position 2 |
|---|---|---|---|
| P2R2 | | | |
| P3R1 | 2 | 1.095 | 1.115 |
| P3R2 | 1 | 0.845 | |
| P4R1 | 1 | 0.875 | |
| P4R2 | 1 | 1.315 | |
| P5R1 | | | |
| P5R2 | | | |
| P6R1 | 1 | 1.275 | |
| P6R2 | 1 | 1.475 | |
| P7R1 | 2 | 0.885 | 2.715 |
| P7R2 | 1 | 1.425 | |

In addition, Table 13 below further lists various values of Embodiment 3 and values corresponding to parameters which are specified in the above conditions.

Figure 10:
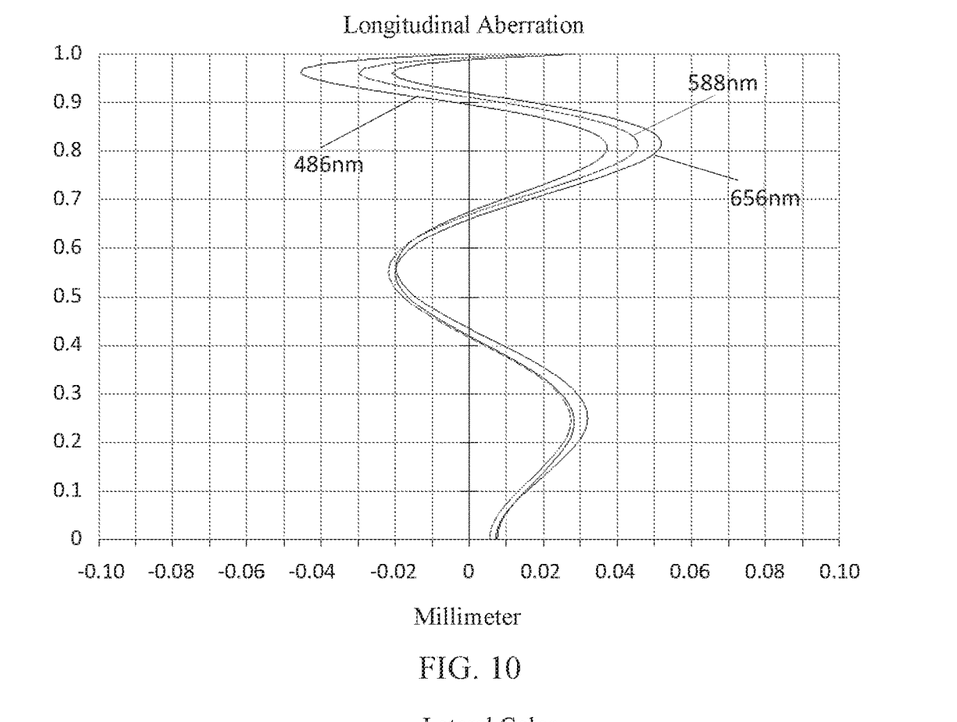
FIG. 10 is a schematic diagram of a longitudinal aberration of the camera optical lens shown in FIG. 9.
Figure 11:
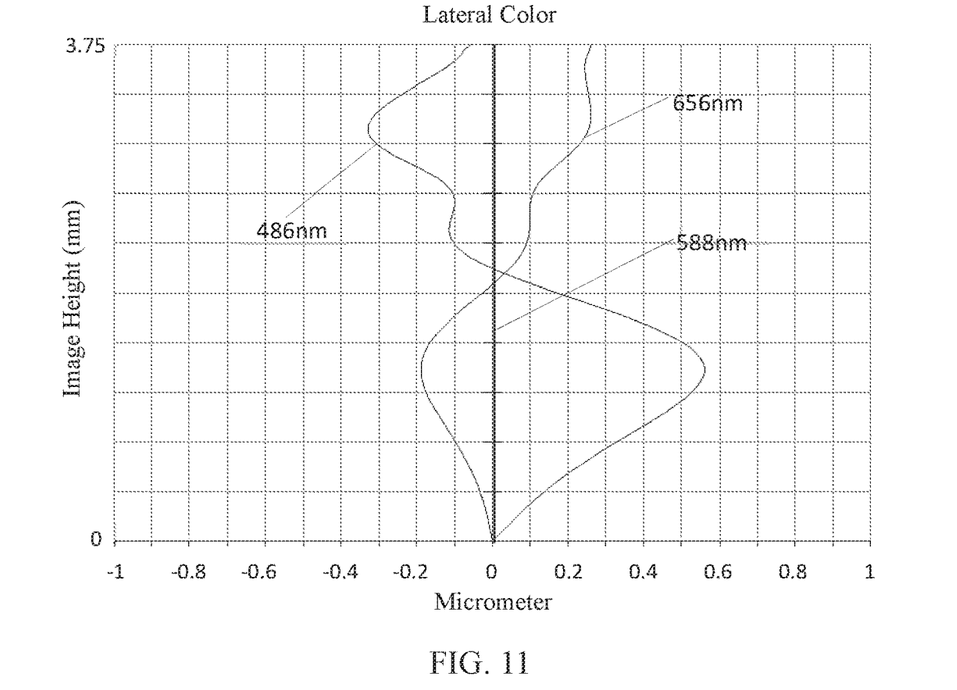
FIG. 11 is a schematic diagram of a lateral color of the camera optical lens shown in FIG. 9.
Figure 12:
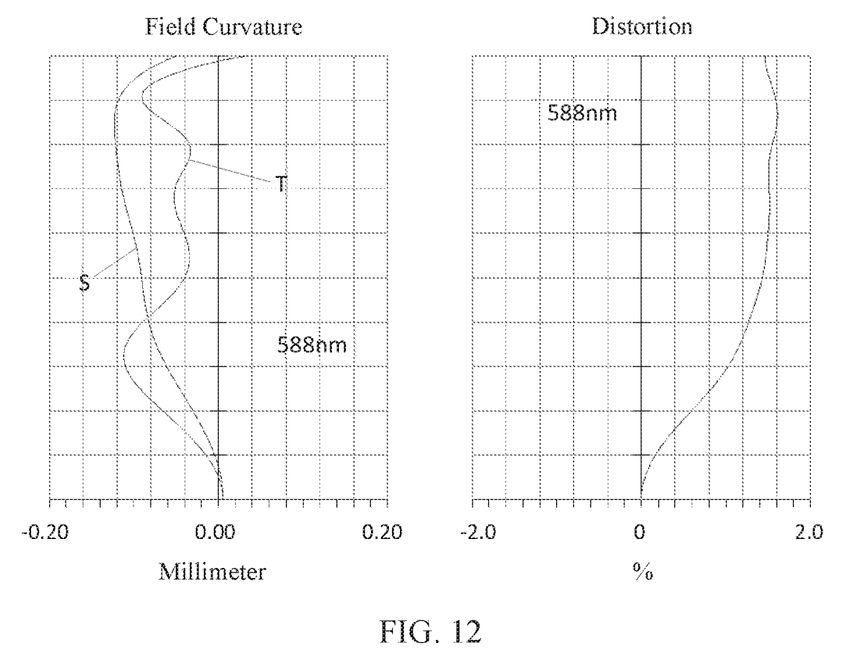
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 486 nm, 588 nm and 656 nm after passing the camera optical lens 30 according to Embodiment 3. FIG. 12 illustrates field curvature and distortion of light with a wavelength of 588 nm after passing the camera optical lens 30 according to Embodiment 3.

In the camera optical lens 30 according to this embodiment, 2ω=76.59° and Fno=1.70. Thus, the camera optical lens 30 can achieve a high imaging performance while satisfying design requirements for wide-angle and ultra-thin lenses having a big aperture.

Table 13 below lists various values of Embodiments 1, 2 and 3 and values corresponding to parameters which are specified in the above conditions (1), (2), (3), (4), (5), (6), (7) and (8) and values of relevant parameters.

TABLE 13

| | Embodiment 1 | Embodiment 2 | Embodiment 3 | Notes |
|---|---|---|---|---|
| n2 | 1.69 | 1.85 | 2 | Condition (1) |
| f3/f | 48.61 | 51.81 | 60.34 | Condition (2) |

TABLE 13-continued

|  | Embodiment 1 | Embodiment 2 | Embodiment 3 | Notes |
|---|---|---|---|---|
| f6/f | 3.22 | 3.27 | 3.85 | Condition (3) |
| \| f1 + f3 + f4 \|/\| f2 + f5 \| | 12.54 | 13.78 | 14.44 | Condition (4) |
| (R5 + R6)/(R5 − R6) | −47.31 | −53.96 | −68.3 | Condition (5) |
| f2 − f | −11.79 | −11.08 | −11.32 | Condition (6) |
| (R9 + R10)/(R9 − R10) | −6.24 | −6.39 | −7.13 | Condition (7) |
| d1/d2 | 9.56 | 9.93 | 10.15 | Condition (8) |
| f | 4.367 | 4.39 | 4.498 | |
| f1 | 4.224 | 4.016 | 4.152 | |
| f2 | −7.427 | −6.694 | −6.82 | |
| f3 | 212.292 | 227.436 | 271.396 | |
| f4 | 6.97 | 7.036 | 6.568 | |
| f5 | −10.399 | −10.615 | −12.72 | |
| f6 | 14.045 | 14.349 | 17.309 | |
| f7 | −16.842 | −16.75 | −11.792 | |
| f12 | 7.614 | 7.55 | 7.835 | |
| IH | 3.552 | 3.552 | 3.552 | |

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
   an aperture;
   a first lens having a positive refractive power;
   a second lens having a negative refractive power;
   a third lens having a positive refractive power;
   a fourth lens having a positive refractive power;
   a fifth lens having a negative refractive power;
   a sixth lens having a positive refractive power; and
   a seventh lens having a negative refractive power,
   wherein the camera optical lens satisfies following conditions:

$1.68 \leq n2 \leq 2.20$; and $15.00 \leq f3/f$, where
   f denotes a focal length of the camera optical lens;
   n2 denotes a refractive index of the second lens; and
   f3 denotes a focal length of the third lens.

2. The camera optical lens as described in claim 1, further satisfying a following condition:

$2.50 \leq f6/f \leq 5.00$, where
   f6 denotes a focal length of the sixth lens.

3. The camera optical lens as described in claim 1, further satisfying a following condition:

$10.00 \leq |f1+f3+f4|/|f2+f5| \leq 20.00$, where
   f1 denotes a focal length of the first lens;
   f2 denotes a focal length of the second lens;
   f4 denotes a focal length of the fourth lens; and
   f5 denotes a focal length of the fifth lens.

4. The camera optical lens as described in claim 1, further satisfying a following condition:

$(R5+R6)/(R5-R6) \leq -20.00$, where
   R5 denotes a curvature radius of an object side surface of the third lens; and
   R6 denotes a curvature radius of an image side surface of the third lens.

5. The camera optical lens as described in claim 1, further satisfying a following condition:

$-15.00 \leq f2 - f \leq -11.00$, where
   f2 denotes a focal length of the second lens.

6. The camera optical lens as described in claim 1, further satisfying a following condition:

$-10.00 \leq (R9+R10)/(R9-R10) \leq -6.00$, where
   R9 denotes a curvature radius of an object side surface of the fifth lens; and
   R10 denotes a curvature radius of an image side surface of the fifth lens.

7. The camera optical lens as described in claim 1, further satisfying a following condition:

$9.00 \leq d1/d2 \leq 12.00$, where
   d1 denotes an on-axis thickness of the first lens; and
   d2 denotes an on-axis distance from an image side surface of the first lens to an object side surface of the second lens.

* * * * *